Re 12,427 12-26-1905
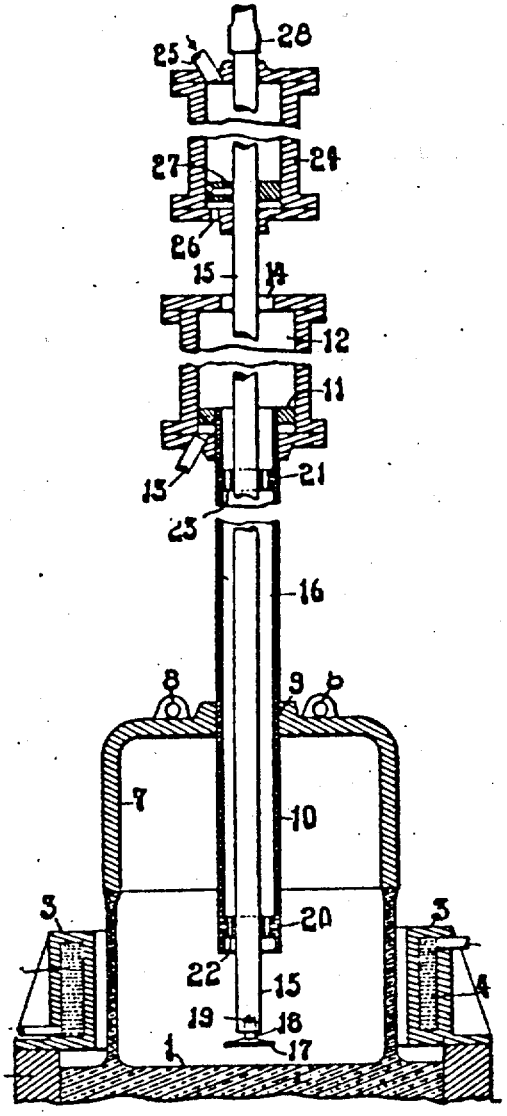

UNITED STATES PATENT OFFICE.

GEORGE H. HARVEY, OF GLENFIELD, PENNSYLVANIA, ASSIGNOR, BY MESNE ASSIGNMENTS, TO BROWNSVILLE GLASS COMPANY, OF PITTSBURG, PENNSYLVANIA, A CORPORATION OF PENNSYLVANIA.

GLASS-DRAWING MACHINE.

No. 12,427. Specification of Reissued Letters Patent. Reissued Dec. 26, 1905.

Original No. 772,510, dated October 18, 1904. Application for reissue filed November 12, 1904. Serial No. 232,548.

*To all whom it may concern:*

Be it known that I, GEORGE H. HARVEY, a citizen of the United States, residing in Glenfield borough, in the county of Allegheny and State of Pennsylvania, have invented or discovered new and useful Improvements in Glass-Drawing Machines, of which the following is a specification.

In the accompanying drawing the view shows a portion of a glass-drawing machine in vertical section.

The object of my invention, generally stated, is to provide means whereby glass sheets in hollow form can be drawn from a receptacle which is unobstructed by air-passages therethrough and also means for preventing a circulation of air throughout the interior of the gatherer.

In the form of gatherer in use at present the air-supply intended to prevent the cylinder of glass from collapsing is discharged through a pipe connected to the gatherer. The circulation is very irregular, and after the gatherer has risen from within the orifice formed by the cooler the gathering edge generally cools off, its cooling being hastened by the circulation of the air-current through the gatherer and out the escape-port. It is evident that the chilling and the consequent contraction of the gatherer will cause the pendent glass cylinder to crack off and drop from the gatherer, thus not only ruining the draw of glass, but also endangering the operatives and the machine. Accidents of this nature frequently occur, and it is my object to prevent the same, as will more clearly appear from the detailed description below and the accompanying drawing, which, however, are merely illustrative of the principles of my invention in general.

Referring now to the drawing for a detailed description of my invention, 1 designates the glass, which is in a plastic or semiplastic condition. It is contained in a holder 2 of any preferred design. An annular cooler 3 sits on the holder 2 and has an annular chamber 4, to which is connected the inlet-pipe 5 and the outlet-pipe 6 for the admission and discharge of a cooling medium for the exterior surface of the cylinder, if the same be employed.

The gatherer 7 has the eyes 8 or other suitable means for attaching the mechanism (not shown) for raising and lowering the gatherer. In the orifice 9 in the gatherer is the pendent tube 10, which has the piston 11 secured to the upper end and having travel in the cylinder 12.

13 is the inlet-pipe through which pressure is applied to the under side of the piston 11.

The tube 15 passes through the tube 10, but is somewhat smaller, so that a passage 16 is formed between the tubes 10 and 15. The upper end of the cylinder has an orifice 14, which is larger than the tube 15.

17 represents a deflector supported by a lug 18, said lug being secured at the lower end of tube 15 by means of a rivet 19. The body of the deflector is shown as a disk with its upper surface inclined downwardly to direct the cooling fluid toward the apex of the draw or place where the cylinder issues from the bath 1.

20 and 21 represent annular rings, which are rigidly secured to tubes 10 and 15 and have ports 22 and 23 passing through them.

Above the cylinder 11 is located a second cylinder 24, which has an inlet 25 and an air-vent 26. A piston 27, rigidly secured to the tube 15, has a vertical movement in said cylinder. The upper end of tube 15 extends through the cylinder 24 and a flexible pipe 28 is secured thereto. This pipe is connected to a source of gaseous supply and has sufficient slack to permit the required travel of the tube 15 without detaching the flexible pipe from said tube.

The general operation is as follows: Assuming that the glass 1 in the receptacle 2 is in a condition suitable for drawing in hollow form and that a cooling medium is circulating through the chamber 4 of the cooler 3, the operator then lowers the gatherer 7 by suitable means (not shown) secured to the eyes 8, into the orifice formed within the annular cooler 3 and until the rim of the gatherer 7 is immersed in the glass 1. After the glass adheres thereto the gatherer 7 is raised at a speed best suited to cause the pendent glass adhering thereto to be raised therewith and of a uniform thickness. A current of gaseous fluid under pressure passes down through tube 15 and is discharged against the deflector 17, which causes the current to be deflected laterally toward the line of juncture of the walls of the cylinder of glass and the glass contained in the receptacle, thereby preventing ripples or creases in the body of the glass contained in the receptacle, which would occur if no means were provided to deflect the gaseous fluid laterally as it is discharged from the tube. By the use of the deflector the tube 15 is enabled to discharge its fluid close to the glass contained in the receptacle, which aids in preventing the glass cylinder from contracting at its base. After the cylinder is filled with gaseous fluid the surplus passes up through the passage 16 and through ports 22 and 23 out into the space within the cylinder 12 above the piston 11 and thence into the open air. It is to be understood that as the cylinder of glass increases in length during the process of drawing the volume of gaseous fluid within the draw is increased. After the gatherer 7 and the pendent glass adhering thereto have been drawn up the predetermined height the pendent glass is ready to be severed from the glass contained in the receptacle. As will be noted, there is no direct circulation of gaseous fluid around the interior of the gatherer 7 as would occur if the discharge were directly through the gatherer instead of pendent tube 10. Thus I form a cushioning of the gaseous pressure in the gatherer and above the lower extremities of tubes 10 and 15 after the gatherer passes from without the orifice formed by the annular cooler 3, and as the heat rises from the glass in the receptacle into the interior of the draw it is collected in this cushioning-space and tends to keep the gatherer from chilling and contracting, which would otherwise result in the pendent glass breaking off at its junction with the gatherer. Before the glass is detached from the gatherer and after the draw is finished the operator permits a fluid under pressure to pass through pipe 13, then into cylinder 12, and discharge below the piston 11, which causes said piston to travel upwardly, carrying with it the tubes 10 and 15 and also the piston 27. After the tubes and deflector have cleared the top of the gatherer 7 the gatherer and glass can be removed, as desired, from alinement with the tubes and another gatherer substituted. The operator then releases the pressure from under piston 11 and permits a fluid under pressure to pass through pipe 25, then to cylinder 24, and discharge above the piston 27, which causes the piston 27 to travel downward, thereby lowering the tubes 10 and 15 and the deflector 17 through the orifice 9 and the gatherer 7 and leaving them in position for the next draw, while the pistons have resumed their former positions.

What I claim is—

1. In the manufacture of glass, a receptacle, a gatherer having an outlet therefrom, a pendent tube in said gatherer and a deflector secured to the exit of said tube and having a fluid-guiding surface extending outwardly and downwardly.

2. In the manufacture of glass, a receptacle, a gatherer, a pendent tube in said gatherer, and a disk-like deflector located below the tube and having its support independent of the receptacle.

Signed at Pittsburg, Pennsylvania, this 9th day of November, 1904.

GEO. H. HARVEY.

Witnesses:
F. N. BARBER,
A. M. STEEN.